US012680564B2

(12) United States Patent
Yoshimi

(10) Patent No.: US 12,680,564 B2
(45) Date of Patent: Jul. 14, 2026

(54) ROTARY CLAMP DEVICE

(71) Applicant: KOSMEK LTD., Kobe (JP)

(72) Inventor: Masahiro Yoshimi, Kobe (JP)

(73) Assignee: KOSMEK LTD. (JP)

( * ) Notice: Subject to any disclaimer, the term of this patent is extended or adjusted under 35 U.S.C. 154(b) by 336 days.

(21) Appl. No.: 18/692,803

(22) PCT Filed: Sep. 12, 2022

(86) PCT No.: PCT/JP2022/033996
§ 371 (c)(1),
(2) Date: Mar. 16, 2024

(87) PCT Pub. No.: WO2023/067945
PCT Pub. Date: Apr. 27, 2023

(65) Prior Publication Data
US 2024/0376921 A1      Nov. 14, 2024

(30) Foreign Application Priority Data

Oct. 18, 2021    (JP) ................................. 2021-170480

(51) Int. Cl.
*B23Q 3/06*          (2006.01)
*B25B 5/04*          (2006.01)
(Continued)

(52) U.S. Cl.
CPC ................ *F16B 7/182* (2013.01); *B23Q 3/06*
(2013.01); *B25B 5/04* (2013.01); *B25B 5/062*
(2013.01); *F15B 15/14* (2013.01)

(58) Field of Classification Search
CPC ........... B25B 5/04; B25B 5/062; F16B 7/182;
B23Q 3/06; F15B 15/14; F15B 15/1433;
F15B 15/1438; F15B 15/068
See application file for complete search history.

(56) References Cited

U.S. PATENT DOCUMENTS 4,508,327 A *  4/1985  Ersoy ...................... B25B 5/062
92/33
5,820,118 A *  10/1998  Craft ...................... B25B 5/062
269/30
(Continued)

FOREIGN PATENT DOCUMENTS

CN        110529455        12/2019
DE        10252549          5/2004
(Continued)

OTHER PUBLICATIONS

International Search Report dated Nov. 29, 2022 issued in connection with International Application No. PCT/JP2022/033996 (2 pages).
(Continued)

*Primary Examiner* — Seahee Hong

(74) *Attorney, Agent, or Firm* — Merek, Blackmon & Voorhees, LLC

(57) ABSTRACT

Provided is a highly durable, compact rotary clamp device. In a housing body, a large-diameter hole and a medium-diameter hole are continuously formed in this order from a lower side in an axial direction. A cylindrical protruding member which is hermetically inserted in the large-diameter hole is screwed into the housing body. A key member is inserted between the medium-diameter hole and a cylindrical retainer inserted in the medium-diameter hole. The retainer is positioned relative to the housing body in a circumferential direction by the key member.

3 Claims, 3 Drawing Sheets

(51) Int. Cl.
    *B25B 5/06*        (2006.01)
    *F15B 15/14*      (2006.01)
    *F16B 7/18*       (2006.01)

(56) References Cited

U.S. PATENT DOCUMENTS

| | | | | |
|---|---|---|---|---|
| 6,663,093 | B2 * | 12/2003 | Yonezawa | B25B 5/062 |
| | | | | 269/27 |
| 6,902,158 | B2 * | 6/2005 | Yonezawa | B25B 5/062 |
| | | | | 269/24 |
| 7,574,953 | B2 * | 8/2009 | Tanaka | B25B 5/062 |
| | | | | 92/136 |
| 9,032,862 | B2 * | 5/2015 | Yong | F15B 15/063 |
| | | | | 92/31 |
| 2003/0189279 | A1 * | 10/2003 | Yonezawa | B25B 5/062 |
| | | | | 269/24 |

FOREIGN PATENT DOCUMENTS

| | | |
|---|---|---|
| JP | 5-52304 | 7/1993 |
| JP | 5-56334 | 7/1993 |
| JP | 2004-268187 | 9/2004 |
| JP | 2005-61560 | 3/2005 |

OTHER PUBLICATIONS

Machine generated translation of JP5-52304.

* cited by examiner

FIG. 3A
FIG. 3B
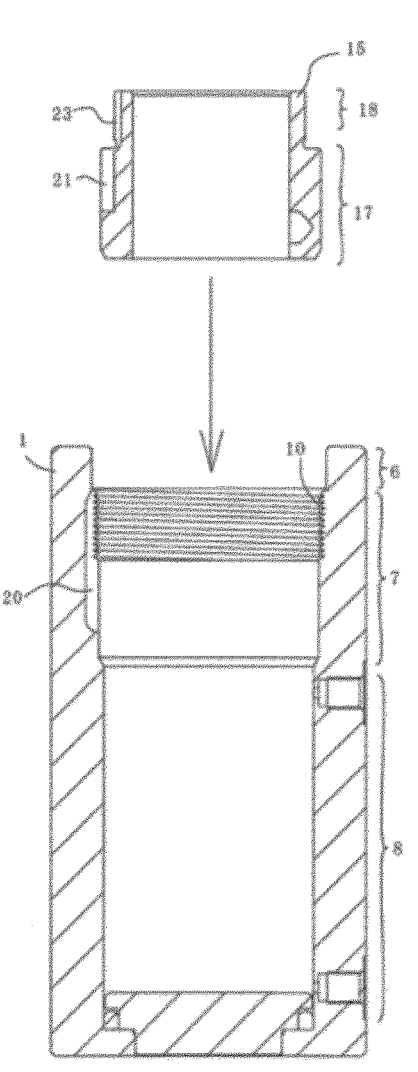
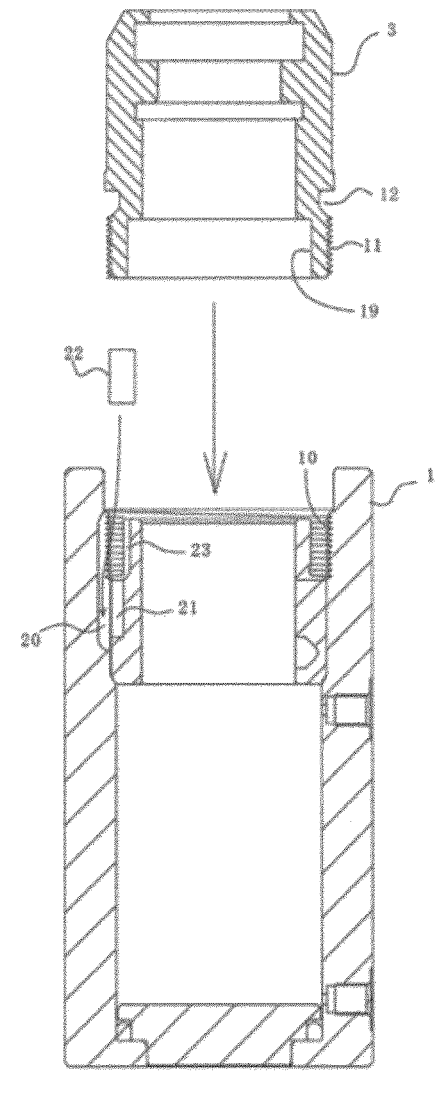

ROTARY CLAMP DEVICE

TECHNICAL FIELD

The present invention relates to a rotary clamp device for fixing objects to be fixed, such as workpieces, molds, tools, etc., to a table, a robot arm, etc. by rotating and lowering a clamp arm.

BACKGROUND ART

A conventional rotary clamp device of this type is described in Patent Document 1 (Japan. Unexamined Utility Model Application Publication No. 5-52304). The conventional technology consists of the following.

In the rotary clamp device shown in FIG. 5 of Patent Document 1, a piston is inserted into a cylindrical hole of a cylinder tube. A cylindrical rod cover is inserted into the tip of the cylindrical hole of the cylinder tube to protrude upward from the cylinder tube. A piston rod, which protrudes from the piston toward the tip side, is inserted into the cylindrical hole of the rod cover to protrude to the outside of the cylinder cover. The rod cover is received from below by a stepped portion formed on the inner circumferential wall of the cylindrical hole of the cylinder tube, and is prevented from coming off from the cylindrical hole of the cylinder tube by a retaining ring. A threaded hole is penetrated radially through the cylindrical wall of the cylinder tube, and a screw is screwed into the threaded hole. The tip of the screw is inserted into a recess formed on the outer circumferential wall of the rod cover. According to this, the rod cover is prevented from rotating with respect to the cylinder tube.

In addition, in the rotary clamp device of FIG. 1 of Patent Document 1, the rod cover is fixed to the cylinder tube by a ring nut instead of the above retaining ring.

RELATED ART DOCUMENTS

Patent Documents

Patent Document 1: Japanese Unexamined Utility Model Application Publication No. 5-52304

DISCLOSURE OF THE INVENTION

Problems to be Solved by the Invention

The above conventional technology has the following problems.

The rod cover is prevented from coming off from the cylinder tube by the retaining ring attached to the inner circumferential wall of the cylinder tube between the cylinder tube and the rod cover. To install the retaining ring between the cylinder tube and the rod cover, it is necessary to provide a space for inserting the retaining ring between the cylinder tube and the rod cover, a space for insertion work, and a space for inserting an installation tool, etc. Therefore, the radial dimension of the cylinder tube is increased. In addition, when the piston moves to the tip limit position, the screw and the retaining ring will be subjected to impact forces caused or generated by the piston hitting the rod cover. In order to make a structure that can withstand the impact forces, it is necessary to have a structure that prevents loosening by increasing the diameter of the screw as much as possible, increasing the number of threads of the screw groove, as well as to increase the thickness and width dimensions of the retaining ring to improve durability. Therefore, the cylindrical wall of the cylinder tube must be set to have a sufficient wall thickness. Thus, the radial dimension of the rotary clamp device becomes larger.

In the rotary clamp device shown in FIG. 1 of the Patent Document 1, the ring nut is attached from above between the outer circumference of the rod cover and the inner circumference of the cylinder tube. Therefore, it is necessary to provide a space for inserting the ring nut between the cylinder tube and the rod cover and a space for inserting a tool, etc. Thus, the radial dimension of the rotary clamp device becomes larger.

The purpose of the present invention is to provide a highly durable and compact rotary clamp device.

Means to Solve the Problem

In order to achieve the above purpose, the present invention, for example, as shown in FIGS. 1 and 2, configures a rotary clamp device as follows.

A large-diameter hole 6, a medium-diameter hole 7, and a small-diameter hole 8 are formed in a housing body 2 in this order from the tip side to the base side in an axial direction. A cylindrical protruding member 3 is hermetically inserted into the large-diameter hole 6. A male threaded portion 11 formed on the outer circumferential wall of the protruding member 3 is screwed into a female threaded portion 10 formed on the inner circumferential wall of the medium-diameter hole 7. A cylindrical retainer 15 is inserted into the medium-diameter 7. A first key groove 20 is formed on the inner circumferential wall of the medium-diameter hole 7 in the axial direction. A second key groove 21 facing the first key groove 20 is formed on the outer circumferential wall of the retainer 15 in the axial direction. A key member 22 is mounted between the first key groove 20 and the second key groove 21. A piston 25 is hermetically inserted into the small-diameter hole 8 so as to be movable in the axial direction. A piston rod 30, which protrudes or extends from the piston 25 toward the tip side in the axial direction, protrudes outward from the protruding member 3 through the cylindrical hole 31 in the retainer 15 and the cylindrical hole 19 in the protruding member 3. An engaging member 38 protrudes radially inward from the inner circumference of the retainer 15. The engaging member 38 is inserted into a spiral groove 39 and a linear groove 40 which are formed on the outer circumferential wall of the piston rod 30 so as to be continuous in this order from the base side in the axial direction. A part of the circumferential wall of the first key groove 20 is formed so as to be radially outward of the inner circumference of the large-diameter hole 6.

The present invention has the following effects.

The protruding member is directly and firmly screwed into the housing body by means of the male threaded portion and the female threaded portion, thus increasing the durability of an engagement portion between the protruding member and the housing body. Also, since there is no need to provide a separate member for connecting between the protruding member and the housing body, the rotary clamp device can be made small.

BRIEF DESCRIPTION OF THE DRAWINGS

FIG. 3A shows a retainer removed from a housing and FIG. 3B shows a retainer, and a key member removed from a housing.

PREFERRED EMBODIMENT OF THE INVENTION

Figure 1:
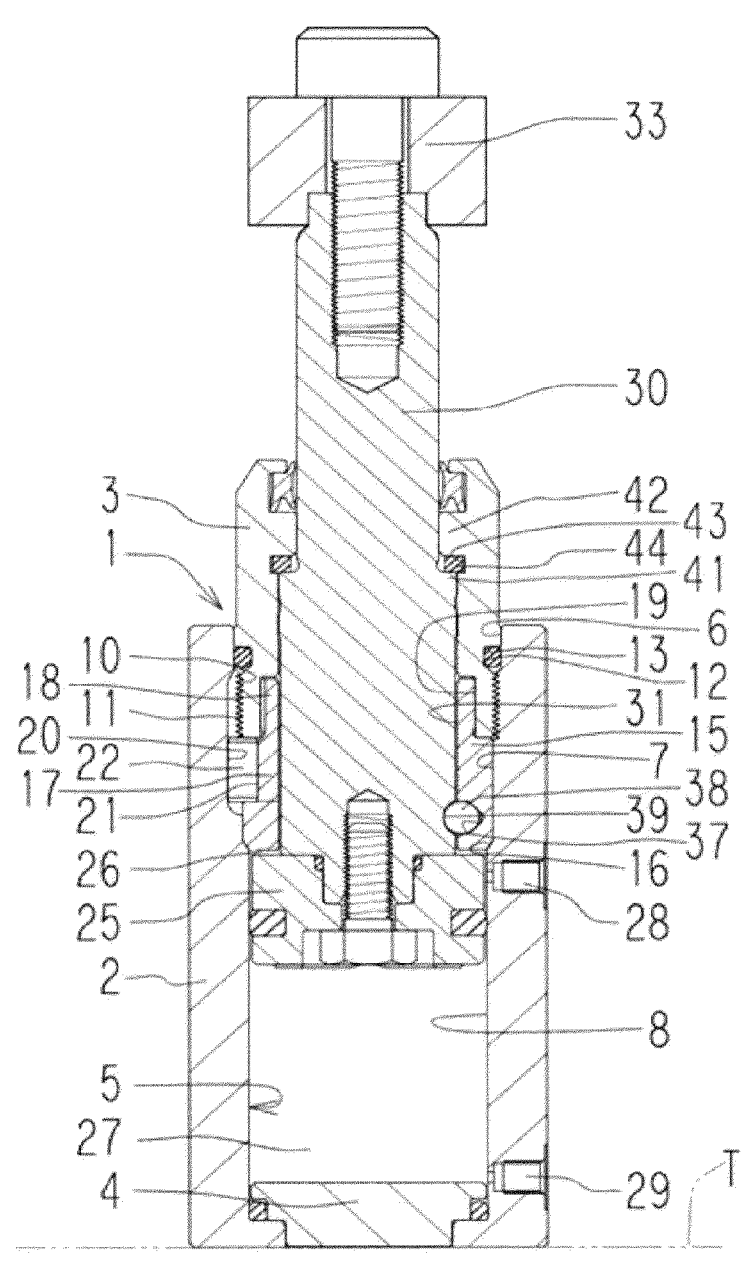
FIG. 1 is a schematic cross-sectional view of a rotary clamp device, showing a preferred embodiment of the present invention.

A preferred embodiment of the present invention will be described below with reference to FIGS. 1, 2, 3A and 3B.

A housing 1 of a rotary clamp device has a housing body 2, a protruding member 3 and a lid member 4, and the housing body 2 is preferably composed of aluminum drawing member. A cylinder hole 5 is formed in the housing body 2. The cylinder hole 5 has a large-diameter hole 6, a medium-diameter hole 7, and a small-diameter hole 8, formed in this order from the upper side (axial tip side), i.e., the diameter of the large-diameter hole is greater or larger than the diameter of medium diameter hole 7 and the small-diameter hole and the diameter of the medium-diameter hole 6 is greater or larger than the small-diameter hole 8.

The lower portion of the protruding member 3 is inserted into the above-mentioned large-diameter hole 6. A female threaded portion 10 is formed on the upper half portion of the medium-diameter hole 7, and a male threaded portion 11 formed on the protruding member 3 is screwed into the female threaded portion 10. Therefore, the protruding member 3 is fixed to the housing body 2 in a state in which it protrudes upward from the housing body 2. A housing groove 12 is formed circumferentially on the upper side of the male threaded portion 11 of the protruding member 3, and a sealing member 13 such as an O-ring is mounted in the housing groove 12. When the sealing member 13 is brought into close contact with the sealed surface constituted by the inner circumference of the large-diameter hole 6 with the protruding member 3 screwed into the housing body 2, a space between the inner circumference of the large-diameter hole 6 and the outer circumference of the protruding member 3 is sealed.

A cylindrical retainer 15 is inserted into the lower half portion of the medium-diameter hole 7 (see FIGS. 3A and 3B) and the retainer 15 is received from below by a stepped portion 16 formed between the small-diameter hole 8 and the medium-diameter hole 7. The retainer 15 has a large-diameter portion 17 and a small-diameter portion 18 formed in this order from the bottom. The small-diameter portion 18 is inserted into a cylindrical hole 19 of the protruding member 3. A first key groove 20 is vertically formed on the inner circumferential wall of the medium-diameter hole 7, and a second key groove 21 is formed on the outer circumferential wall of the large-diameter portion 17 of the retainer 15, at a position facing the first key groove 20. The deepest part of the bottom surface of the first key groove 20 is set to be located radially outward from the inner circumference of the large-diameter hole 6. A parallel pin serving as a key member 22 is mounted between the first key groove 20 and the second key groove 21 with a sliding space between them (see FIG. 3B). The retainer 15 is provided with a passage groove 23 continuous with the second key groove 21 on the small-diameter portion 18 side to facilitate entry of the key member 22. According to this, the retainer 15 is positioned circumferentially relative to the housing body 2 and is prevented from rotating.

A piston 25 is hermetically inserted into the small-diameter hole 8 so as to be movable in the vertical direction (in the axial direction of the cylinder hole 5). A clamping chamber 26 is formed on the upper side of the piston 25 (see FIG. 2) and an unclamping chamber 27 is formed on the lower side of the piston 25 (see FIGS. 1 and 2). A clamp supply/discharge port 28 for supplying/discharging compressed air from a compressed air source is formed on the body portion of the housing body 2, and the clamp supply/discharge port 28 is communicated to the clamping chamber 26. An unclamp supply/discharge port 29 is formed on the body portion of the housing body 2 on the lower side of the clamp supply/discharge port 28, and the unclamp supply/discharge port 29 is communicated to the unclamping chamber 27.

Figure 2:
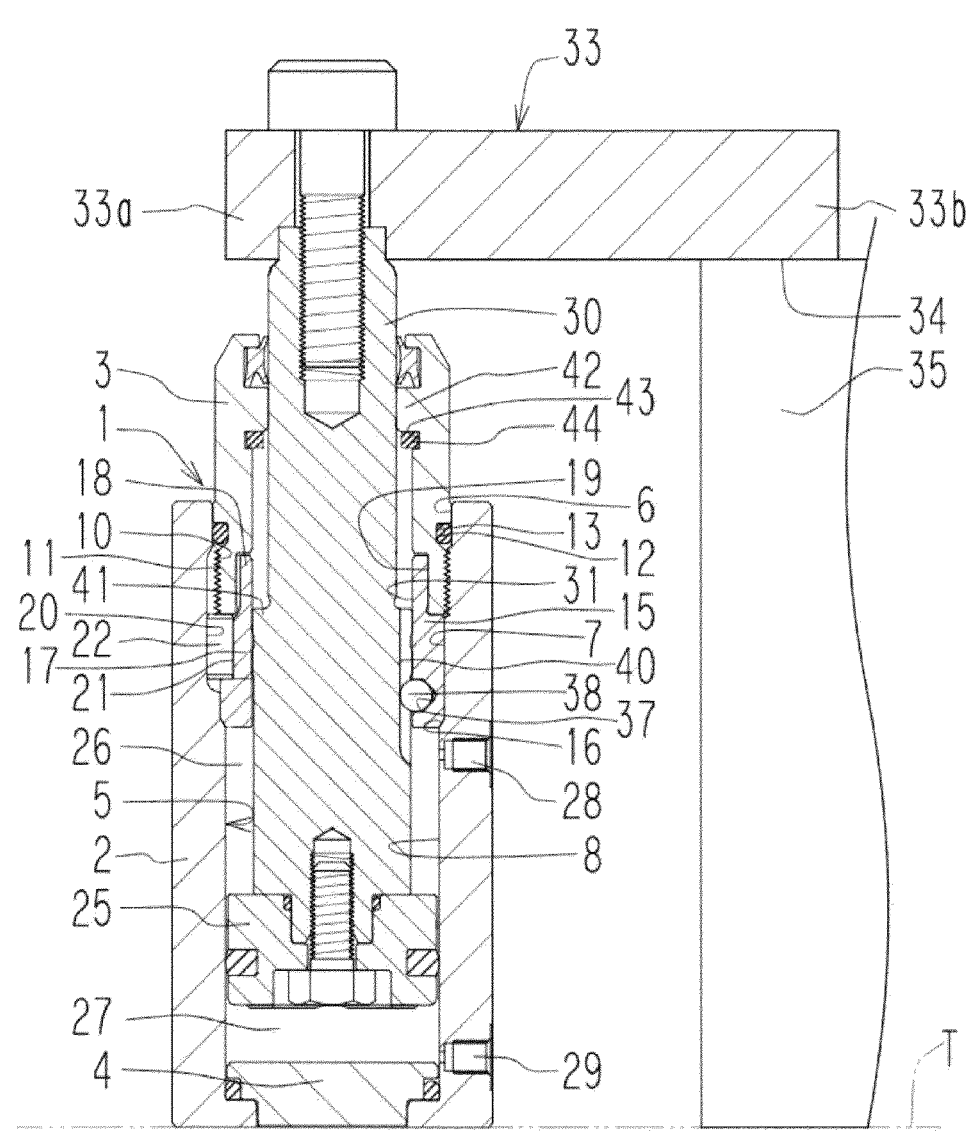
FIG. 2 shows a clamping state of the above rotary clamp device.

A piston rod 30 protrudes or extends upward from the piston 25 to be inserted into a cylindrical hole 31 of the retainer 15 as well as to be inserted into the cylindrical hole 19 of the protruding member 3 hermetically movable in the vertical direction. The piston rod 30 protrudes outward or upwardly from the protruding member 3 as seen in FIGS. 1 and 2. One end portion 33a of a clamp arm 33 is screwed to the tip of the piston rod 30. A pressing portion 34 is formed on the back surface of the other end portion 33b of the clamp arm 33, and the pressing portion 34 is capable of coming into contact with a workpiece (an object to be fixed) 35.

A spherical engaging ball (engaging member) 38 is mounted in a recess 37 formed on the inner circumferential wall of the above retainer 15. The engagement ball 38 is protruded radially inward from the inner circumference of the retainer 15. The engaging ball 38 is inserted into or travels in a spiral groove 39 and a straight groove 40, which are formed continuously in order from the lower side on the outer circumferential wall of the piston rod 30.

A stepped portion 41 is circumferentially formed on the outer circumferential wall of the piston rod 30 above the spiral groove 39. Further, a protrusion portion 42 protrudes or extends radially inward from the inner circumference of the cylindrical hole 19 of the protruding member 3. A housing groove 43 is circumferentially formed on the inner circumferential wall of the cylindrical hole 19 below the protrusion portion 42. An impact absorbing member 44 such as a spring member made of rubber, resin, or metal is mounted in the housing groove 43. When the piston rod 30 is moved to the upper limit position, the stepped portion 41 of the piston rod 30 is received via an impact absorbing member 44 by the protrusion portion 42 of the protruding member 3.

As shown in FIGS. 1 and 2, the above-mentioned rotary clamp device operates as follows.

In the initial state (unclamped state) of FIG. 1, compressed air (pressure fluid) is discharged from the clamping chamber 26 and compressed air (pressure fluid) is supplied to the unclamping chamber 27. The compressed air in the unclamping chamber 27 moves the piston 25 and the piston rod 30 to the upper limit position, and an engagement portion formed on the stepped portion 41 of the piston rod 30 is received from above by the impact absorbing member 44.

When switching from the unclamping state shown in FIG. 1 to the clamping state shown in FIG. 2, the compressed air in the unclamping chamber 27 is first discharged to the outside through the unclamping supply/discharge port 29, and compressed air from the compressed air source is supplied into the clamping chamber 26 through the clamping supply/discharge port 28. The compressed air in the clamping chamber 26 moves the piston 25 downward, and the piston 25 is moved downward while being rotated clockwise in a plan view by the spiral groove 39 and the engagement ball 38. i.e., the engagement ball 38 traveling in spiral groove 39. The piston 25 is then moved straight downward by the straight groove 40 and the engaging ball 38. i.e., the engagement ball 38 traveling in straight or linear groove 40. The clamp arm 33 presses the workpiece 35 placed on a table T from above, and lowering of the piston 25 is stopped. The rotary clamp device is thus switched from the unclamped state shown in FIG. 1 to the clamped state shown in FIG. 2.

When the clamping state shown in FIG. 2 is switched to the unclamping state shown in FIG. 1, the compressed air in the clamping chamber 26 is discharged and the unclamping chamber 27 is supplied with compressed air. The compressed air in the unclamping chamber 27 then moves the piston 25 and the piston rod 30 straight upward. Next, the clamp arm 33 is moved upward while being rotated counterclockwise in a plan view. The engagement portion of the piston rod 30 is received from above by the impact absorbing member 44 of the protruding member 3, and rising of the piston rod 30 is stopped. The rotary clamp device is thus switched from the clamped state shown in FIG. 2 to the unclamped state shown in FIG. 1.

The above embodiment has the following advantages.

Since the protruding member 3 is directly and firmly screwed in the housing body 2 by the female threaded portion 10 and the male threaded portion 11 of the housing body 2, there is no need for a separate member to connect the protruding member 3 to the housing body 2. Therefore, each of the radial dimensions of the housing body 2 and the protruding member 3 can be reduced. Thus, the rotary clamp device can be made smaller.

As shown in FIGS. 1 and 2, when the rotary clamp device is viewed in cross section, the bottom surface of the first key groove 20 is positioned radially outward from the inner circumference of the large-diameter hole 6 in the housing body 2. Therefore, the housing body 2 and the protruding member 3 are arranged in a well-balanced position such that the key member 22 straddles the outer and inner sides in the radial direction, with the inner circumferential surface of the large diameter hole 6 being abutted and sandwiched between the housing body 2 and the protruding member 3. According to this, the thickness of the cylindrical wall of the housing body 2 and the thickness of the cylindrical wall of the retainer 15 can be made thin, so that each of the radial dimensions of the housing body 2 and the retainer 15 can be made small. As a result, the overall dimensions of the rotary clamp device can be made small.

As the piston 25 and the piston rod 30 move vertically, the circumferential wall of the spiral groove 39 of the piston rod 30 presses the retainer 15 in the circumferential direction via the engaging ball 38. The retainer 15 is securely received via the key member 22 by the housing body 2 to prevent rotation of retainer 15 relative to housing body 2. Therefore, it is difficult for the pressing force to be transmitted to the protruding member 3, which is a member different from the retainer 15, in its circumferential direction. Therefore, loosening of the threaded portion between the housing body 2 and the protruding member 3 due to the circumferential pressing force acting on the threaded portion is prevented. Therefore, wear and damage to the threaded portion and its peripheral members caused by loosening can be prevented, thereby improving the durability of the rotary clamp device.

A thread groove of the female threaded portion 10 is formed in the medium-diameter hole 7 of the housing body 2. The thread groove of the female threaded portion 10 of the present invention is formed longer than the thread groove of the threaded hole formed in the cylinder tube wall in the above conventional rotary clamp device. Therefore, by screwing the female threaded portion 10 to the male threaded portion 11 of the protruding member 3 at an engagement portion with a large area, a large frictional force is capable of acting on the engagement portion. Therefore, even if the impact when the piston rod 30 collides with the protruding member 3 acts on the engagement portion, it can prevent the engagement portion from loosening. Therefore, the wear and damage of the threaded portion and its peripheral members caused by loosening can be prevented, thereby improving the durability of the rotary clamp device.

Each of the above embodiments can be modified as follows.

The pressurized fluid may be another gas or a liquid such as pressurized oil or water instead of the compressed air illustrated.

The housing body 2 may be made of other metals such as iron or other materials instead of aluminum. The housing body 2 is not limited to a pull-out or drawn member, and may be a member formed by machining.

Instead of being received in the stepped portion 16 of the housing body 2 via the retainer 15 by screwing the protruding member 3 into the housing body 2, the protruding member 3 may be received in the housing body 2 (bottom end wall of the first keyway 20) via the key member 22 or directly in the housing body 2. In this case, a space will be formed between the protruding member 3 and the retainer 15. This makes it difficult for the pressing force exerted by the circumferential wall of the spiral groove 39 on the retainer 15 via the engaging ball 38 in the direction around the axis to be transmitted to the protruding member 3 by the vertical movement of the piston 25, etc. As a result, loosening of the threaded portion between the housing body 2 and the protruding member 3 due to the circumferential pressing force acting on the threaded portion is prevented. Therefore, wear and damage caused by loosening can be prevented, and the durability of the rotary clamp device can be improved.

Instead of the spherical engaging ball 38, the engaging member may be a member having another shape such as a substantially cylindrical shape or a rectangular shape.

Instead of being provided on the retainer 15, the above-mentioned engaging member may be provided protruding from the outer circumferential wall of the piston rod 30. In this case, a straight groove and a spiral groove are provided on the circumferential wall of the retainer 15 so as to be continuous (through the circumferential wall) in order from the lower side.

The key member 22 is not limited to being configured by a cylindrical parallel pin, but may also be a polygonal columnar pin or a spherical member. Further, the number of key members 22 is not limited to one, and a plurality of key members may be provided at predetermined intervals on the circumferential wall of the retainer.

Instead of being attached to the projection 42 of the protruding member 3, the impact absorbing member 44 may be attached to the inner circumferential wall of the large-diameter hole 6 of the housing body 2, the lower end of the retainer 15, the upper portion of the piston 25, and the stepped portion 41 of the piston rod 30.

In addition, it goes without saying that various changes can be made within the scope that a person skilled in the art can envision.

DESCRIPTION OF THE PREFERENCE NUMERAL 2 housing body
3 protruding member 6 large-diameter hole
7 middle-diameter hole
8 small-diameter hole
10 female threaded portion
11 male threaded portion
15 retainer
20 first key groove
21 second key way
22 key member
25 piston
30 piston rod
31 cylindrical hole
19 cylindrical hole
38 engaging hole
39 spiral groove
40 straight groove
The invention claimed is:

1. A rotary clamp device, comprising:

a housing body;

a large-diameter hole, a medium-diameter hole and a small-diameter hole formed in the housing body in this order from a tip side to a base side in an axial direction;

a cylindrical protruding member hermetically inserted into the large-diameter hole and protruding from the housing body to the tip side in the axial direction;

a male threaded portion formed on an outer circumferential wall of the cylindrical protruding member and screwed into a female threaded portion formed on an inner circumferential wall of the medium-diameter hole;

a cylindrical retainer inserted into the medium-diameter hole;

a first key groove formed on the inner circumferential wall of the medium-diameter hole in the axial direction;

a second key groove formed on an outer circumferential wall of the cylindrical retainer in the axial direction so as to face the first key groove;

a key member mounted between the first key groove and the second key groove;

a piston hermetically inserted into the small-diameter hole to be movable in the axial direction;

a piston rod protruding from the piston toward the tip side in the axial direction and protruding outward from the cylindrical protruding member through a cylindrical hole of the cylindrical retainer and a cylindrical hole of the cylindrical protruding member;

an engaging member protruding radially inward from an inner circumference of the cylindrical retainer; and a spiral groove and a linear groove continuously formed in this order from the base side in the axial direction on an outer circumferential wall of the piston rod, said spiral groove and said linear groove being configured to receive the engaging member during at least a clamping operation of the rotary clamp device;

wherein a part of a circumferential wall of the first key groove is formed so as to be radially outward of an inner circumference of the large-diameter hole.

2. A rotary clamp device, comprising:

a housing body;

a large-diameter hole, a medium-diameter hole and a small-diameter hole formed in the housing body in this order from a tip side to a base side in an axial direction;

a cylindrical protruding member hermetically inserted into the large-diameter hole and protruding from the housing body to the tip side in the axial direction;

a male threaded portion formed on an outer circumferential wall of the cylindrical protruding member and screwed into a female threaded portion formed on an inner circumferential wall of the medium-diameter hole;

a cylindrical retainer inserted into the medium-diameter hole;

a first key groove formed on the inner circumferential wall of the medium-diameter hole in the axial direction;

a second key groove formed on an outer circumferential wall of the cylindrical retainer in the axial direction so as to face the first key groove;

a key member mounted between the first key groove and the second key groove;

a piston hermetically inserted into the small-diameter hole to be movable in the axial direction;

a piston rod protruding from the piston toward the tip side in the axial direction and protruding outward from the cylindrical protruding member through a cylindrical hole of the cylindrical retainer and a cylindrical hole of the cylindrical protruding member;

an engaging member; and a spiral groove and a linear groove continuously formed in this order from the base side in the axial direction, said spiral groove and said linear groove being configured to receive the engaging member during at least a clamping operation of the rotary clamp device;

wherein a part of a circumferential wall of the first key groove is formed so as to be radially outward of an inner circumference of the large-diameter hole.

3. The rotary clamp device of claim 2, wherein the spiral groove and the linear groove are formed on one of the piston rod and the cylindrical retainer.

* * * * *